Aug. 16, 1960   R. B. HORSFALL, JR., ET AL   2,949,030
GYRASCOPICALLY STABILIZED OPTICAL SYSTEM PLATFORM
Filed April 9, 1949   3 Sheets-Sheet 1

INVENTORS
R.B. HORSFALL, JR.
J.M. SLATER
J.A. WIDENMANN

BY *William R. Lane*
ATTORNEY

Aug. 16, 1960   R. B. HORSFALL, JR., ET AL   2,949,030
GYRASCOPICALLY STABILIZED OPTICAL SYSTEM PLATFORM
Filed April 9, 1949   3 Sheets-Sheet 3

INVENTORS
R.B. HORSFALL, JR.
J.M. SLATER
J.A. WIDENMANN

BY *William P. Lane*
ATTORNEY

United States Patent Office 2,949,030
Patented Aug. 16, 1960

2,949,030

GYROSCOPICALLY STABILIZED OPTICAL SYSTEM PLATFORM

Robert Bruce Horsfall, Jr., Whittier, John M. Slater, Inglewood, and John A. Widenmann, South Pasadena, Calif., assignors to North American Aviation, Inc.

Filed Apr. 9, 1949, Ser. No. 86,424

9 Claims. (Cl. 73—178)

This invention pertains to the navigation of an air, land, or sea vehicle between two points on the earth's surface. In particular it pertains to automatic navigation of a self-propelled device along a predetermined course without external control of the device after its departure from the starting point.

Recent developments in ram jets and rocket propulsion systems, together with the development of aircraft capable of high speed have made it necessary to devise means for operating such craft without having a pilot aboard. The necessity for operating such craft over long ranges of unpopulated or inaccessible terrain, as well as the possibility of hostile radio interference, makes ground-based control by means of radio of limited applicability. The need, therefore, arose for a system of guidance which could be self-contained in the navigated craft, which, when once launched on its way could be depended upon to reach its remote destination with a degree of accuracy comparable with that attainable with piloted craft, and which would be independent of all external control during flight. Such a system was required to be capable of following a path fixed in space with reference to the earth despite wind or other disturbing aerodynamic influences. Recourse was therefore had to principles of inertia and particularly to Newton's laws of motion. These principles are utilized to attain the required result by measuring the acceleration to which the craft is instantaneously subjected, doubly integrating it with respect to time, and using the thus computed displacement of the craft from the starting point to determine its variance from the required course.

Several seemingly insurmountable difficulties are apparent at this point, however. The first of these is that every object on or near the earth is subject to the acceleration of gravity. No acceleration measuring device heretofore known has the ability to distinguish between the acceleration due to gravity and acceleration due to motion with respect to the earth.

A further difficulty is that if gyroscopes or equivalent inertial elements are used alone to stabilize the accelerometers, the resulting drift produces errors in the integrated result which may increase with time without bound. In the absence of such drift, the errors which may arise may, by suitable feedback, be made oscillatory and bounded.

A still further difficulty, assuming that the errors in the accelerometer positions could be periodically checked and calibrated out by reference to celestial bodies, is that the magnitude and complexity of computations required to determine position from stars by known techniques would require computers of great weight and extreme intricacy.

It is therefore an object of this invention to provide a guidance system for land, sea, or air craft which is independent of external control.

Another object of this invention is to provide a guidance system adapted to follow a predetermined path.

It is a further object of this invention to provide means for determining the displacement of an aircraft from its starting point.

Another object of this invention is to provide means for guiding an aircraft along a predetermined route over the earth's surface.

It is a further object of this invention to provide a guidance system of the inertial type, corrected by reference to celestial bodies, which is capable of use at any time of day and at any latitude.

It is still another object of this invention to provide a system of navigation which is in effect insensitive to the acceleration due to the earth's gravitational field.

It is another object of this invention to provide means for guiding an aircraft accurately over a predetermined course without remote control or space-time programming.

It is another object of this invention to provide means for computing the position of an aircraft by reference to celestial bodies by means of an airborne computer.

It is another object of this invention to provide means for tracking stars from a guided missile, said means being driven by simple precomputable functions of time and by the distance traveled over the surface of the earth.

It is another object of this invention to provide a star-tracking device which is relatively light in weight and requires a minimum of skilled labor to build.

It is a further object of this invention to provide an automatic and self-contained means for navigating a missile along a pre-set path with reference to a plane containing the center of the earth and the launching point.

It is a further object of this invention to provide means for holding the accelerometers in an inertial guidance system traveling over the earth's surface in an angular attitude normal to a line joining the system and the center of the earth to minimize the effect of gravity.

It is a further object of this invention to provide an optical system for tracking celestial bodies which is compact and capable of aligning itself with the line of sight to a star.

It is a further object of this invention to provide means for successively switching an optical star-sensing system accurately from one star to another.

It is a further object of this invention to provide means for switching an optical star-tracking device in a moving body from one celestial body to another according to a predetermined time program.

Other objects of invention will become apparent from the accompanying description and drawings, in which.

Figure 1:
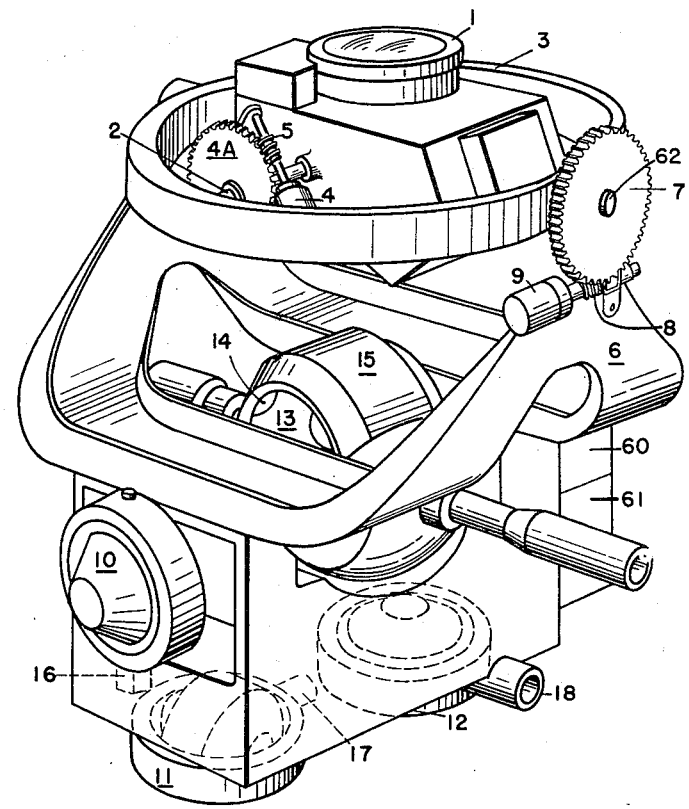
Fig. 1 is a perspective view of the invention.

Referring to Fig. 1, telescope 1 is mounted on shaft 2 supported in gimbal 3. Motor 4 attached to gimbal 3 drives shaft 2 by means of a precision gear train comprising gear 4a and worm 5. Gimbal 3 is supported on frame or platform 6 and is driven by gear 7 and worm 8 attached to motor 9. Frame 6 supports accelerometers 60 and 61 and three gyroscopes 10, 11, and 12 which are orthogonally disposed with respect to each other. Frame 6 is attached to ball 13 rotatable in pads 14—eight in number—attached to ring member 15 which in turn is supported in the aircraft or missile to be guided by this device about an axis parallel to the craft's pitch axis. A rough follow up in pitch prevents interference between ring 15 and platform 6. For additional yaw freedom, as for example where this device is to be used in a conventional airplane, an additional gimbal may be provided. Accelerometers 60 and 61 are arranged to measure acceleration along and normal to the guidance plane, respectively.

In the following discussion, wherever the term "level" or equivalent is used with respect to the platform, it is to be understood that the platform is not tilted laterally when the missile departs from the guidance plane.

Figure 3:
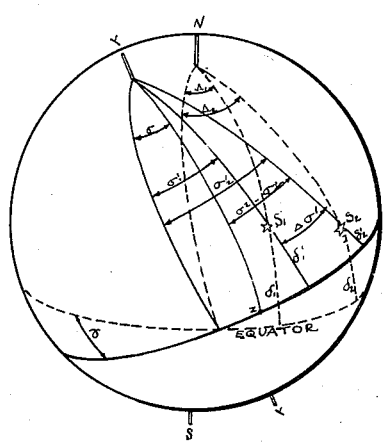
Fig. 3 is a perspective view showing the relationship between the device, the earth, and the stars.

Turning now to Fig. 3, there is shown a perspective view of the earth in relation to the missile and the coordinate system used in the following discussion. Use is made of a cylindrical coordinate system with the cylinder axis normal to the guidance plane. The guidance plane is a great circle plane of the earth containing the launching point and the destination of the navigated craft. The $y$ axis is an axis normal to this plane. The $x$ and $z$ axes lie in the guidance plane with the $x$ axis horizontal. When the missile is in level flight attitude, and in the guidance plane therefore, the $y$ axis is the pitch axis of the missile, the $x$ axis is the range or roll axis and the $z$ axis is the yaw axis and local vertical. In Fig. 3, $z$ represents the point where a line joining the center of the earth and the missile would intersect the surface of the earth, and $S_1$ and $S_2$ are points where a line joining the center of the earth and each of two stars would intersect the earth's surface. $\Lambda_1$ and $\Lambda_2$ denote their longitude angles from the intersection of the guidance plane and the equator. $\sigma$ is the range angle measured from the intersection of the earth's equator and the guidance plane to the missile. $\sigma_1'$ is the angle measured from the intersection of the earth's equator and the guidance plane to the plane containing the $y$ axis and $S_1$, the star first observed by the telescope. $\sigma_2'$ is the angle measured from the aforesaid intersection and the plane containing the $y$ axis and $S_2$, the second star. $\gamma$ is the inclination of the guidance plane with the earth's equatorial plane and is also the angle between the earth's polar axis and the $y$ axis. $A_x$ is the acceleration measured by range accelerometer 60 in the $x$ direction and $A_y$ is the acceleration measured by $y$-axis accelerometer 61 normal to the guidance plane. $\Delta\sigma'$ is the angular difference between $\sigma_1'$ and $\sigma_2'$. $\delta_1'$ is the angle between the guidance plane and a line joining the center of the earth and the first star. $\delta_2'$ is the angle between the guidance plane and the line joining the center of the earth and the second star.

$\delta_1$ is the declination of $S_1$, $\delta_2$ is the declination of $S_2$.

This invention consists in three major elements—a platform which is maintained stable and locally level as the missile travels over the earth, a star-tracking system mounted on the aforesaid platform and driven by precomputable functions of time, and the range angle of the missile, and a computing and driving mechanism for actuating the aforesaid tracking system and for correcting the platform in response to error signals generated by the tracking system.

The platform is shown in Fig. 1. Three orthogonal gyroscopes are attached to the platform with freedom for movement with respect thereto only about axes normal to the gyroscopes' spin axes. In order to visualize the manner in which the platform is maintained locally horizontal throughout the missile's flight it is necessary to understand the action of a gyroscope. A gyroscope is essentially a mass rotating about an axis normally denoted the spin axis. The inertial characteristics of the spinning mass cause it to resist angular motion and, barring disturbing torques, a gyroscope once set spinning tends to remain angularly stationary about any axis except the spin axis. If a torque is applied to a non-spin axis of the gyroscope, the gyroscope tends to rotate about another non-spin axis normal to the torqued axis at a velocity proportional to the torque, but it tends to resist the torque about the torqued axis so the net motion produced by the torque is zero about that axis. The scheme employed in the present invention is that of slaving the platform to the three gyros and then torquing the gyros by the proper amount to assure a level attitude of the platform at all times. The factors which must be taken into account in determining this proper amount of torquing include $\Omega$, the earth's angular velocity, travel of the missile over the surface of the earth at the rate of $$\frac{d\sigma}{dt}$$

and gyroscope errors.

Returning to Fig. 1, torquers 16, 17 and 18 apply torques to the gyroscopes about the yaw, roll and pitch axes, respectively, and thus control the angular attitude of the platform about the pitch, yaw and roll axes, respectively. This control may be exerted directly by pivoting the gyros to the platform about three perpendicular axes or may be exerted indirectly by providing free gyros with position pick-offs on their processional axes and servoing the platform to precession of the gyroscopes due to torquing and the resistance of the platform. This choice is available because, as will hereinafter be related, the star tracking mechanism periodically corrects the level attitude of the platform thus reducing the necessary precision of the platform stabilizing means, it being only necessary for the stabilizing means to carry the platform from one star originated correction to another. This is an outstanding advantage because it eliminates much costly precision machine work in an article which may be used in applications where it would be considered expendable, such as in a guided missile.

Again referring to Fig. 1, gimbal 3 is rotatably supported on frame 6 with angular freedom about an axis 62 normal to the guidance plane. Rotation of the gimbal produces angular deviation of the telescope from the local vertical in the same sense as the angle $\sigma$. This gimbal is used to train the telescope on a star in the guidance plane. To train the telescope on stars which are not in the guidance plane, inner telescope axis 2 is used. This axis is normal to the gimbal axis and measures the angles $\delta'$ to the stars. Thus the telescope is mounted with two degrees of angular freedom, the first degree of freedom being rotation about axis 62 and the second degree of freedom being about axis 2. The term "degree of freedom" as used in this connection connotes not an angular measure but rather the capability of a particular type of motion. By a combination of movements about both axes, it is thus possible to train the telescope on a star in any location. An outstanding feature of this invention is that by choosing these two particular axes rather than those of a conventional altitude-azimuth mount, the required rotations of the telescope to train on stars can be reduced from complex functions to simple functions of time and the angular distance or range angle traversed by the missile. This factor greatly reduces the weight, intricacy, and power consumption of the vehicle borne computing devices and enhances the overall accuracy of the invention.

Figure 2:
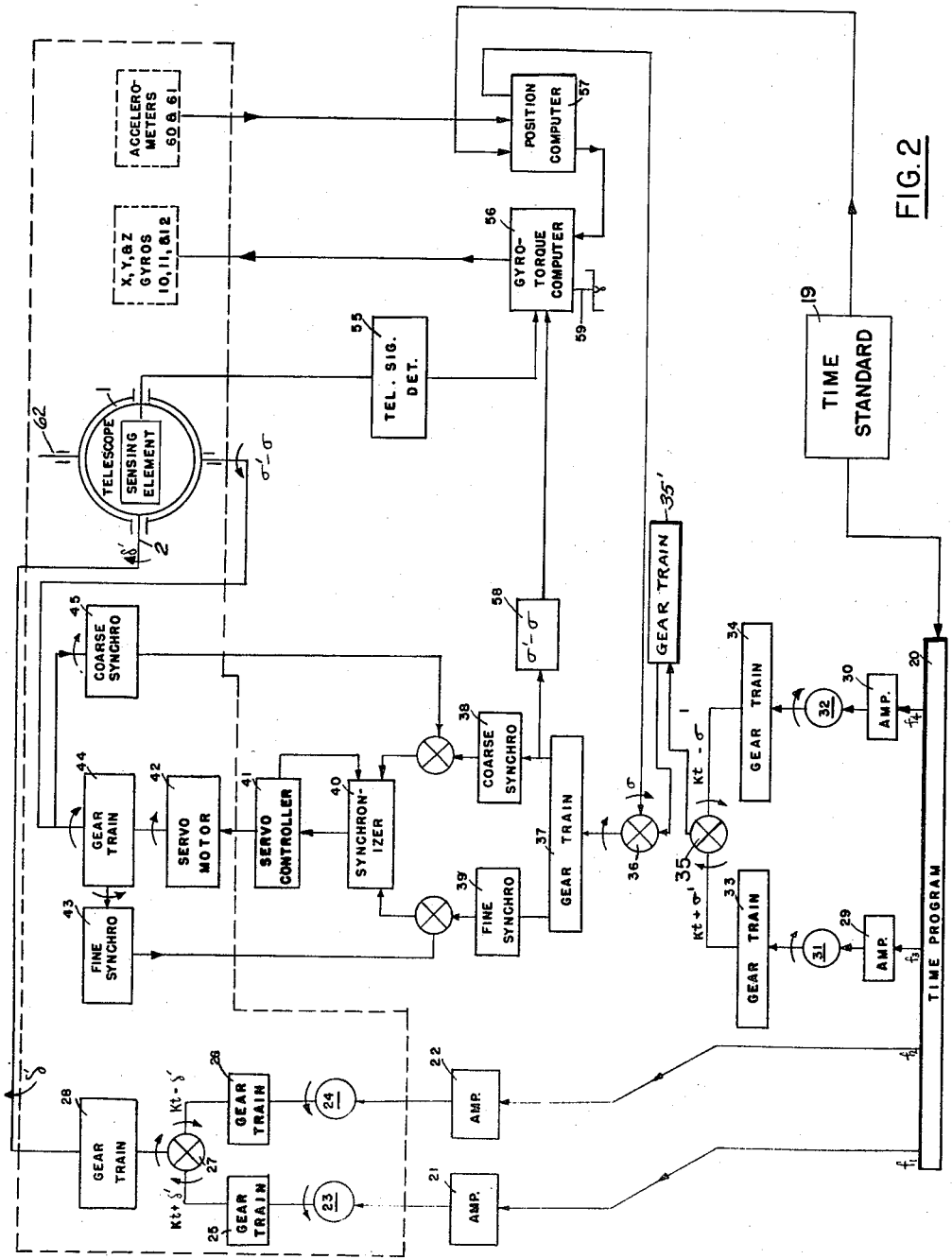
Fig. 2 is a block diagram showing the functions of various components of the invention.

In Fig. 2 the portion of the block diagram enclosed in broken line represents apparatus mounted on the stable platform, the remainder being on the vehicle proper. The function of the diagram is to show how the various components of the invention cooperate. Energy controlled by a very precise time standard 19 drives a magnetic tape or other record 20 on which have been pre-recorded certain mathematical frequency-time functions to be hereinafter described. One of these ($f_1$)

is a function equal to the first time derivative of $(kt+\delta')$ where $k$ is an arbitrary preselected constant chosen so as to keep the resultant frequency always above a minimum determined by the requirements of the hereinafter described synchronous motors, $t$ is time, and $\delta'$ is the transverse angular coordinate of the star to be sighted from the missile vertical. Another $(f_2)$ is a function equal to the first time derivative of $(kt-\delta')$. These two functions are amplified in parallel amplifiers 21 and 22. These two separate signals drive synchronous motors 23 and 24 with an angular velocity proportional to the aforesaid functions. And since velocity is the first differential of displacement, the resultant angular displacements of the motors are then proportional to the integrals of the functions or are simply proportional to $(kt+\delta')$ and $(kt-\delta')$. Motors 23 and 24 connect to gear trains 25 and 26 which are connected to a differential 27 whose output to gear train 28 is proportional to the difference between the two input rotations or simply $2\delta'$. Gear train 28 reduces this rotation to $\delta'$, which is the required rotation for the telescope to train upon a certain predetermined star to be used in guiding the craft. This rotation is about an axis in the guidance plane and is supplied to inner telescope axis 2. Arrangement for switching from one star to another is made by simple pre-control of the recorded signal. The two recorded functions are devised so that they have $\delta'$ values which periodically change to the values required to train on a new preselected star.

In a similar manner $f_3$ and $f_4$ are frequencies proportional to the first time derivatives of $(kt+\sigma')$ and $(kt-\sigma')$ where $\sigma'$ is the precomputed angular distance of the star to be sighted along the guidance plane measured from the intersection of the guidance plane and the earth's equator. They are amplified in parallel amplifiers 29 and 30 which drive synchronous motors 31 and 32 at speeds proportional to the input frequencies. Again the displacements of the motor shafts are proportional to the integrals of $f_3$ and $f_4$ or simply to $(kt+\sigma')$ and $(kt-\sigma')$. These rotations are reduced in gear trains 33 and 34 and used to drive differential 35 which subtracts the two functions yielding a shaft rotation proportional to $2\sigma'$ which is reduced to a rotation proportional to $\sigma'$ in gear train 35'. This rotation is fed to differential 36 which also receives a rotation from position computer 57 proportional to $\sigma$, the angular distance of the missile from the intersection of the guidance plane and the equator. The differential subtracts these two rotations and its output turns a gear train 37 which in turn drives a coarse synchro 38 and a fine synchro 39 which in turn actuates synchronizer 40, servo controller 41, servo motor 42, fine synchro 43, gear train 44, and coarse synchro 45. These synchro devices are employed to transfer the output of gear train 37 (equal to $\sigma'-\sigma$), to telescope axis 62, in order to reduce the amount of mechanism which must be carried on the platform and also to eliminate carrying any complicated shaft rotations from the missile to the platform. It is to be understood that the physical embodiment of the invention shown perspectively in Fig. 1 has been simplified in certain details to facilitate understanding. Among these details is the drive mechanism, Fig. 1 showing only a motor and worm and gear combination to accomplish the proper rotations of the telescope. This type of mechanism would be practicable but not as precise as the mechanism shown in Fig. 2, which is capable of highly precise rotations.

The synchronous motors, preferably of the salient pole type, are required to follow a variable frequency over a sufficiently wide range to permit the speed at the output of the differential to drive the telescope in either direction at any rate between zero and the maximum slewing rate required. This may require a range of synchronous speeds as great as 10:1, and change of speed through the complete range in two to five seconds.

The only elements for driving outer gimbal axis 62 which are on the platform are servo motor 42, gear train 44, fine synchro 43 and coarse synchro 45. Servo motor 42 may be mounted on gimbal 3 in Fig. 1 in a similar manner to motor 9 which corresponds to motor 42 in Fig. 2. The net effect is that telescope axis 62 is driven with an angular displacement equal to $(\sigma'-\sigma)$, which is the required rotation for training on the desired star. One of the important objects of this invention is thus achieved; the rotations of the telescope necessary to train it upon a star are accomplished by simple precomputable functions of time and by the distance made good by the missile. Switching from one star to another in pitch angle is accomplished in the same way as previously described in transverse angle, i.e., the recorded signals are devised so that the values of $\sigma'$ change from the value for $S_1$ to the value for $S_2$ successively in synchronism with the corresponding changes in $\delta'$. The telescope is thus switched successively to train on one star for a predetermined interval and then on another star for a succeeding interval.

Thus far we have shown means for training the telescope so that it points at the stars, except for errors in platform orientation. Next in order for consideration is the manner in which the device is used to correct the angular attitude of the platform to conform to information gathered by the telescope. Many devices have been developed for sensing departure of a spot of light from a desired location. Any of these may be adapted to the telescope herein described. One such device which has some advantages is described in the following paragraphs, but it is not intended as a limitation on the scope of the present invention.

Figure 4:
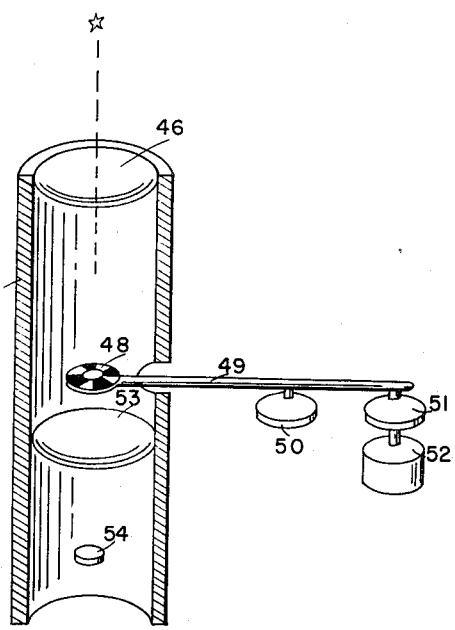
Fig. 4 is a detailed view of the star-sensing means in this invention.

Referring to Fig. 4, light from a star enters telescope 1 and passes through lens system 46 which focuses the light into a star image. It then passes through circular plate 48 which has alternate transparent and opaque sector-shaped strips equally spaced about its annular rim. Circular plate 48 describes a motion such that every point on the plate moves in a circle of equal diameter. This motion is accomplished by attaching the plate rigidly to rod 49 which in turn rides eccentrically on idler 50 and drive wheel 51 of equal diameter and is driven by motor 52 at constant speed. After passing through plate 48 the light is refocused by lens 53 and then strikes photoelectric tube 54.

Operation of the device is as follows: If the star is observed by the telescope to be exactly aligned with the optical axis of the telescope, the star image will trace a circle upon plate 48 which will be exactly concentric with the plate. Consequently, as the star image passes consecutively over the plate from one strip to another, the photoelectric cell will sense an alternating signal of constant amplitude and frequency due to the fact that light only passes through the transparent sectors on the plate. Each impulse due to a transparent strip will have the same amplitude because the circle described is concentric with the plate. Likewise, the frequency remains constant because the star image passes the same number of strips per unit time throughout the circle. However, if the star does not lie on the telescope axis, the trace cast on plate 48 will no longer be concentric with the plate but will be eccentric by an amount proportional to the amount of deviation of the star from the telescope optical axis. Therefore the frequency of the resultant photocell signal will no longer be constant because the trace will now pass closer to the periphery of the plate on one side and closer to the center on the other. The result is a modulation of the frequency of impulses detected by the photocell. The magnitude of the change in frequency observed is a function of the magnitude of the deviation of the star image at right angles to the telescope optical axis and the phase of the frequency shift is a measure of the direction of the star from the telescope optical axis. This deviation may be resolved into two rectangular components, representing small rotations, $\theta\xi$ about the inner telescope axis 2 and $\theta\eta$ about an axis normal thereto. It has been found that the actual errors in alignment of the telescope optical axis, and hence of the telescope, can be expressed as follows:

$$\theta_x = \csc(\Delta\sigma)[\theta\xi_1 \sin(\sigma_2^1 - \sigma) - \theta\xi_2 \sin(\sigma_1^1 - \sigma)]$$
$$\theta_z = \csc(\Delta\sigma)[\theta\xi_1 \cos(\sigma_2^1 - \sigma) - \theta\xi_2 \cos(\sigma_1^1 - \sigma)]$$
$$\theta_y = \theta\eta_1 \sec \delta_1^1 + [\theta\xi_1 \ctn(\Delta\sigma) - \theta\xi_2 \csc(\Delta\sigma)] \tan \delta_1^1$$

where $\theta_x$, $\theta_y$, and $\theta_z$ are the errors in alignment about the $x$, $y$, and $z$ axes, respectively, and the other terms are defined in connection with Fig. 3. But $\theta\xi_2$ represents the error which would be detected by sighting the star not presently being viewed and may be assumed to be zero since that star has just been sighted and the platform corrected to reduce $\theta\xi_2$ to zero.

The error equations then reduce to:

$$\theta_x = \theta\xi_1 \csc(\Delta\sigma) \sin(\sigma_2^1 - \sigma)$$
$$\theta_z = \theta\xi_1 \csc(\Delta\sigma) \cos(\sigma_2^1 - \sigma)$$
$$\theta_y = \theta\eta_1 \sec \delta_1^1 + \theta\xi \ctn(\Delta\sigma) \tan \delta_1^1$$
$$L_y = k_1\theta_y + k_2(\Omega \cos \gamma + \sigma)$$

Correction torques proportional to $\theta_x$, $\theta_y$ and $\theta_z$ must be added to the computed leveling torques. Total torques to be applied to the gyros are thus given by:

$$L_x = k_1\theta_x + k_2(\Omega \sin \gamma \cos \sigma)$$
$$L_z = k_1\theta_z + k_2(\Omega \sin \gamma \sin \sigma)$$

where $L_x$, $L_y$, and $L_z$ are the torques to be applied to the gyros controlling platform rotation about the $x$, $y$, and $z$ axes respectively, $k_1$, and $k_2$ are proportionality constants, $\Omega$ is the earth's angular velocity ($2\pi$ radians per 24 sidereal hours) and $\dot\sigma$ is the first time derivative of the angular distance from the intersection of the equator and the guidance plane to the missile. The first term in each equation is the corrective torque, and the balance is the computed leveling torque. It should be noted that the latter depend on constants $\Omega$ and $\gamma$, the single variable $\sigma$ and its time derivative $\dot\sigma$.

From photocell 54 the signals are fed to telescope signal detector 55 which resolves the errors into $\theta\eta$ and $\theta\xi$, amplifies the results, and feeds them to gyro torque computer 56 which is a conventional computer capable of computing the aforesaid equations from information furnished by potentiometer 58, telescope signal detector 55, position computer 57, and $\gamma$ preset 59. Position computer 57 takes the output of accelerometers 60 and 61 and by double integration provides a signal proportional to the distance travelled by the missile and to the deviation of the missile laterally from the guidance plane. Note that in the above equations the only non-constant quantities are $\sigma$, $\dot\sigma$, $\theta\xi$ and $\theta\eta$. Consequently, the computation is relatively simple considering the complexity of the problem. Torque computer 56 then controls gyro torquers on the platform in response to the computed torques to keep the platform stable and the telescope axis aligned on the star being sighted. Note that $\gamma$ is present into torque computer 56 prior to flight, its value being determined by the inclination of the guidance plane with the plane of the earth's equator.

While the telescope is "looking" at one star, of course, the platform may drift slightly out of level attitude about the line of sight to that star. Therefore, the provision made for switching from one star to another as hereinbefore described is an important feature of the invention. By successively switching from one star to another, the platform is kept constantly earth level, the gyros being designed with sufficient precision to hold the platform in adequately level position between successive sights. It is to be noted that the telescope has no function in fixing the position of the missile in the sense of a celestial fix but merely acts to correct the platform orientation. Nor do the errors determined by the telescope affect the telescope driving mechanism. The telescope drive is independent of telescope errors and is only affected by the accelerometer outputs as modified by the position computer and by predetermined quantities recorded on the magnetic tape.

In operation in connection with a guided missile, the device functions as follows: Preparatory to launching the missile points in a generally vertical direction. In this position the platform is brought to level attitude with respect to the earth by torquing the gyroscopes the appropriate amount. This amount is a constant since the earth's angular velocity is constant. The torque can therefore be furnished by a torsion spring which exerts torque about the gyroscope's precessional axis. The torsion in the torsion spring can be adjusted by simply winding the spring until the platform ceases angular movement with respect to the launching point, thus indicating synchronous rotation of the platform and the earth and then locking the spring in wound position. Alternatively, an electromagnetic torquer similar to that shown in application Serial No. 81,374 filed March 14, 1949, now abandoned, in the name of J. M. Slater et al., may be used. Each gyroscope in general controls either a component of the platform's rotation with respect to the local vertical or the alignment of the platform heading with the target. Each gyro is therefore torqued the appropriate amount to cause alignment of the platform on the target at launching and to keep the platform exactly level at the launching point.

The missile is then launched but during the first moments after launching, the telescope, being situated in the body of the missile so as to be able only to see athwart the beam of the missile, sees no stars. The missile therefore depends upon the torqued gyroscopes to keep the platform level. The gyroscopes are precise enough so that they can accomplish this task with sufficient accuracy. At a predetermined time after launching the missile levels off in flight bringing the stars into the field of vision of the telescope. At a suitable time prior to launching the magnetic tape begins feeding signals to the telescope drive computers so as to train the telescope upon the first star to be sighted by the time this star is visible. The torque computer then begins to function in the manner hereinbefore related so as to correct the angular attitude of the platform to coincide with local earth vertical. Switching to the second star and thereafter to successive stars further corrects the platform's angular attitude to keep it always locally earth level.

One of the advantages attained by this invention which had not heretofore been attained is the reduction in size of window required for peering out of the missile. This reduction is made possible by the provision of only one telescope and means for switching the one telescope successively from one star to another. A further reduction in window size is made possible by the fact that the platform is level at all times and the telescope trains about axes which intersect its line of sight near the window. If the platform were not at all times level, rotation of the platform with respect to the missile, taking place about the platform mount, would further enlarge the required window area.

Another advantage afforded by the arrangement of this invention is the freedom of the system from latitude limitations which some systems impose. Using this invention, no difficulty is experienced in flights across the polar regions, a limitation which is inescapable in a conventional latitude-longitude system.

And of course a very significant advantage inheres in the overall arrangement which is coordinated by the choice of axes and rotations required to train the telescope on a star so that the missile-borne computer is minimized in complexity and size. A corollary advantage lies in the flexibility of the system because as possible missile ranges are extended, no additional equipment need be added to allow switching the telescope to greater and greater numbers of successive stars. In fact, with some modification, this invention could be adapted for inter-planetary navigation because the concept of correcting the angular attitude of a sensitive element by reference to celestial bodies is basically independent of the earth.

It should be understood that additional mechanical means for leveling the accelerometers or portions of the platform exclusive of the telescope and its associated gimbal in response to lateral departures from the guidance plane are not excluded from this invention. The embodiment described is preferred for reasons of mechanical simplicity only.

Although the invention has been described and illustrated in detail, it is to be clearly understood that the same is by way of illustration and example only and is not to be taken by way of limitation, the spirit and scope of this invention being limited only by terms of the appended claims.

I claim:

1. In combination, an inertial guidance system comprising accelerometers and a movably mounted gyro-stabilized platform connected with said accelerometers, a plurality of gyroscopes for keeping said accelerometers and platform locally earth level, said accelerometers being oriented to be sensitive to motions of said platform in a plane normal to a line joining said platform and the center of the earth, a telescope mounted on said platform with two degrees of angular freedom, record driving means for sequentially training said telescope on preselected stars, means sensitive to light received from said stars by said telescope for periodically torquing said gyroscope to correct the angular attitude of said platform, and means responsive to said accelerometers for producing signals indicative of the motion of said platform in a plane normal to a line joining said platform and the center of the earth.

2. An angularly movable support, accelerometer means and gyroscopic means for stabilizing the angular attitude of said support relative to local earth level, and means for controlling the stabilization of said angular attitude by said accelerometer and gyroscopic means comprising a telescope mounted for angular movement with respect to said support, means for training said telescope successively on preselected celestial bodies, and means responsive to said accelerometer means and to light received by said telescope from said celestial bodies for torquing said gyroscopic means to thereby vary the angular attitude of said support to control the stabilization achieved by said accelerometer and gyroscopic means.

3. In an inertial guidance system characterized by accelerometers, an angularly shiftable gyro stabilized element including gyroscopes for holding the accelerometers so as to be insensitive to gravitational acceleration, torquers on said gyroscopes responsive to said accelerometers for shifting said stabilized element at the rate required to compensate for earth rotation and for motion of said system over the earth, means for supervising the angular attitude of said stabilized element including telescope means for gathering light from a star, computing means for successively training said telescope on preselected stars, and means responsive to light from individual ones of said stars for modifying the response of said torquers to said accelerometers in the sense required to correct the angular attitude of said stabilized element to thereby keep said accelerometers insensitive to gravity.

4. Means for tracking a celestial body from an object moving approximately in a diametral plane over the earth's surface comprising a telescope, a base for said telescope, gyroscopes on said base, accelerometers on said base, means for torquing said gyroscopes in response to said accelerometers to maintain said base substantially locally earth level, means for rotating said telescope about an axis normal to said diametral plane with respect to said base, means for rotating said telescope about an axis in said diametral plane with respect to said base, means for driving said rotating means in response to a predetermined program, and means responsive to errors detected by said telescope for supplying supplementary torques to said gyroscopes to correct the angular attitude of said base whereby said telescope is kept trained on said celestial body and said base is kept locally level with respect to the earth.

5. In a gyro stabilized platform having a plurality of gyroscopes with freedom for rotation about their precessional axes, said platform having an accelerometer mounted thereon, means for controlling the angular attitude of said platform relative to the earth comprising telescopic means on said platform for determining the displacement of the line of sight of an optical axis from the line of sight to a star, means responsive to said accelerometer for predeterminately training said telescopic means on successive stars in response to precomputable functions of time and the distance traveled by said platform, means for torquing said gyroscopes in response to said displacement whereby said platform is maintained locally earth level and said telescopic means is kept trained on successive stars.

6. Means for navigating a body over the surface of the earth with reference to a diametral plane of the earth comprising doubly integrating accelerometers rigidly orthogonally oriented, leveling means for maintaining the sensitive axis of one of said accelerometers normal to a line connecting the center of the earth and said body and parallel to said diametral plane, an optical system adapted to collect light from one or more celestial bodies, means for rotating the axis of said optical system about an axis normal to said diametral plane, means for rotating the axis of said optical system about an axis in said diametral plane, means for driving said rotating means according to predetermined functions of time and the angular distance traveled over the earth as determined by said one accelerometer, and means responsive to the light collected from said celestial bodies for periodically correcting said leveling means, whereby said body is navigated along any predetermined path with reference to said diametral plane.

7. In an automatic navigation system the combination comprising accelerometers rigidly oriented orthogonally with respect to each other, inertial means for maintaining the sensitive axis of at least one of said accelerometers in a plane normal to a line joining said accelerometers and the center of the earth, said inertial means being inherently subject to error, an optical system for collecting light from one of a set of celestial bodies, means responsive to light collected by said optical system for correcting the error of said inertial means, pre-recorded means for training the axis of said optical system upon predetermined celestial bodies of said set in response to predetermined functions of time and the angular distance traversed by said inertial means, and means for predeterminably switching said optical system from one celestial body of said set to another.

8. In combination with an optical system mounted with two degrees of angular freedom and adapted to be successively trained on a plurality of celestial bodies from a moving body, record means for carrying preselected functions of time and the angular coordinates of said celestial bodies, inertial means for generating a signal proportional to the angular distance traversed by said system, and computer means responsive to said record means and to said generating means for rotating said optical system to thereby train it on successive celestial bodies.

9. A device as recited in claim 8 in which said record means is a magnetic tape on which are recorded signals having frequency values which when subtracted yield signals proportional to the required rotations for said optical system and in which said computer means comprises a plurality of synchronous motors adapted to rotate in proportion to said recorded signals, and differential means connected between said motors and optical system for rotating said optical system according to the difference between said recorded signals to thereby train said optical system on said celestial bodies.

References Cited in the file of this patent

UNITED STATES PATENTS

| | | | |
|---|---|---|---|
| 1,801,329 | Carter | Apr. 21, | 1931 |
| 1,942,604 | Kennedy | Jan. 9, | 1934 |
| 2,109,283 | Boykow | Feb. 22, | 1938 |
| 2,227,037 | Schlesinger | Dec. 31, | 1940 |
| 2,362,827 | Joachim | Nov. 14, | 1944 |
| 2,371,626 | Kecskemeti | Mar. 20, | 1945 |
| 2,381,478 | Zukor | Aug. 7, | 1945 |
| 2,439,392 | Jones | Apr. 13, | 1948 |
| 2,444,933 | Jasperson | July 13, | 1948 |
| 2,513,367 | Scott | July 4, | 1950 |
| 2,529,619 | Maney | Nov. 14, | 1950 |
| 2,532,402 | Herbold | Dec. 5, | 1950 |
| 2,591,697 | Hays | Apr. 8, | 1952 |
| 2,715,776 | Knowles et al. | Aug. 23, | 1955 |
| 2,762,123 | Schultz et al. | Sept. 11, | 1956 |

FOREIGN PATENTS

| | | | |
|---|---|---|---|
| 33,746 | Netherlands | Sept. 16, | 1934 |